United States Patent [19]

Keung et al.

[11] Patent Number: 4,692,379

[45] Date of Patent: Sep. 8, 1987

[54] HEAT SEALABLE FILM AND METHOD FOR ITS PREPARATION

[75] Inventors: Jay K. Keung, Macedon, N.Y.; Kevin M. Donovan, Milford, Conn.; Ricardo Balloni, Fairport, N.Y.

[73] Assignee: Mobil Oil Corporation, New York, N.Y.

[21] Appl. No.: 780,159

[22] Filed: Sep. 26, 1985

[51] Int. Cl.$^4$ .............................................. B32B 27/00
[52] U.S. Cl. ..................................... 428/349; 428/35; 428/516; 428/448; 524/267; 524/731
[58] Field of Search ................. 428/349, 346, 35, 347, 428/516, 448; 525/240; 524/731, 267

[56] References Cited

U.S. PATENT DOCUMENTS

| | | | |
|---|---|---|---|
| 4,343,852 | 8/1982 | Isaka et al. | 428/216 |
| 4,400,428 | 8/1983 | Rosenthal et al. | 428/349 |
| 4,419,411 | 12/1983 | Park | 428/516 |
| 4,502,263 | 5/1985 | Crass et al. | 428/349 |
| 4,590,125 | 5/1986 | Balloni | 428/347 |

FOREIGN PATENT DOCUMENTS 164157 12/1980 Japan ................................. 428/346

Primary Examiner—Edith Buffalow
Attorney, Agent, or Firm—Alexander J. McKillop; Michael G. Gilman; Charles J. Speciale

[57] ABSTRACT

An oriented, heat sealable polymer film laminate possessing a low coefficient of friction, good receptivity for water-based coatings and good optical clarity and a method for manufacturing such a laminate are provided.

22 Claims, No Drawings

HEAT SEALABLE FILM AND METHOD FOR ITS PREPARATION

BACKGROUND OF THE INVENTION

This invention relates to the field of polymer film laminates and methods for forming such films, and in particular, to a film laminate possessing an oriented polypropylene (OPP) core layer faced on each side thereof with a layer containing a heat sealable polymer such as an ethylene-propylene-butene-1 (EPB) terpolymer, an ethylene-propylene (EP) random copolymer or blend thereof.

Heat sealable multilayer films which are especially useful as packaging materials are well known in the art.

U.S. Pat. No. 4,343,852 describes a uniaxially or biaxially stretched composite film packaging material of from 5 to 200 microns total thickness possessing a propylene polymer base film and at least one surface film containing at least two of (a) an ethylene-propylene (EP) copolymer, (b) a propylene-alpha-olefin copolymer and (c) a copolymer of butene and any other alpha-olefin. The propylene polymer base film can contain any one of a variety of additives, e.g., a lubricating agent such as a fatty acid amide, and each surface film can contain from 0.01 to 0.15 parts by weight of a silicone oil to improve its coefficient of friction in the heated state and reduce its slide resistance caused during hot plate seal by an automatic packaging machine. Examples of silicone oils which are said to be useful for this purpose are polydimethylsiloxane, polymethylphenylsiloxane, olefin-modified silicone, polyether (e.g. polyethylene glycol, polypropylene glycol)-modified silicone, olefin/polyether-modified silicone, epoxy-modified silicone, etc.

U.S. Pat. No. 4,400,428 describes a heat sealable, multilayer film packaging material possessing a biaxially stretched polypropylene film as the base film, an adhesion-promoting layer of modified polyolefin, a gas-barrier layer of hydrolyzed ethylene-vinyl acetate copolymer and a heat-sealing layer of olefin polymers, wherein the base film carries on at least one surface an optionally at least monoaxially oriented layer combination consisting of: (a) a heat sealable outer layer of polyethylene or of an ethylene copolymer containing at least 3%, and preferably at least 4%, by weight of ethylene; (b) an adhesion-promoting layer of modified polyolefin; (c) a gas-barrier layer of a hydrolyzed ethylene/vinyl acetate copolymer containing from 50 to 80 mole percent of vinyl acetate units of which at least 90% by hydrolyzed; (d) an adhesion-promoting layer of modified polyolefin; and, (e) a layer of polyethylene or of an ethylene copolymer containing at least 3, preferably at least 4% by weight of ethylene. Layer (a) contains an additive combination consisting of: (1) from 0.3 to 1% by weight, based on the sealable layer, of a long-chain aliphatic amine; (2) from 0.1 to 0.7% by weight, based on the sealable layer, of a dispersed thermoplastic polymer which is incompatible with the polyethylene or ethylene copolymer and which has a softening point at most 50° C. below or above the softening point of the polyethylene or ethylene copolymer; and, (3) from 0.1 to 1.2% by weight, preferably 0.2–0.7, based on the sealable layer, of a polydialkylsiloxane, preferably polydimethylsiloxane. The foregoing additive combination is said to produce a multilayer film having very good slipping properties combined with good machine processibility compared to known multilayer films containing known type lubricants such as the fatty acid amides, e.g., erucamide.

U.S. Pat. No. 4,419,411 describes an oriented multilayer polypropylene film structure comprising coextended layers of: (a) a base layer comprising polypropylene of comparatively high stereoregularity, the precursor resin of which contains an amide of a water-insoluble monocarboxylic acid having about 8 to about 24 carbon atoms, e.g., erucamide; (b) a skin layer comprising a polyolefin of comparatively low stereoregularity on at least one surface of (a), said skin layer containing a surface-modifying proportion of a combination of finely divided silica and a silicone oil such as a 30,000 centistokes polydimethylsiloxane; the surface of skin layer (b) having bloomed thereon a surface-modifying proportion of at least some of the amide of base layer (a).

U.S. Pat. No. 4,502,263 describes a heat sealable polyolefinic multilayer film possessing a base layer comprised of a propylene polymer and at least one sealable layer containing at least one propylene copolymer, at least one low-molecular weight resin and at least one polydiorganosiloxane, wherein the sealing layer comprises a combination of: (a) from about 68.5 to 89.7% by weight, based on the weight of the sealable layer, of an olefin resin composition comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition; (b) from about 5 to 15% by weight, based on the weight of the sealable layer, of a low-molecular weight resin, which is compatible with the olefin resin composition; (c) from about 5 to 15% by weight, based on the weight of the sealable layer, of a propylene homopolymer; and (d) from about 0.3 to 1.5% by weight, based on the weight of the sealable layer, of a polydiorganosiloxane such as any of those referred to above.

SUMMARY OF THE INVENTION

In accordance with the present invention, there is provided an oriented, heat sealable polymer film laminate possessing a low coefficient of friction, good receptivity for water-based coatings and good optical clarity which comprises:

(a) an upper heat sealable, water-based coating-receiving layer coextensively adherent to the upper surface of a core layer (b), said upper layer (a) being formed from a polymer selected from the group consisting of ethylene-propylene-butene-1 terpolymer, ethylene-propylene random copolymer and blends thereof, said polymer being compounded with an anti-blocking effective amount of anti-blocking agent but being substantially devoid of silicone oil, the exposed surface of upper layer (a) being coated with a coefficient of friction-reducing amount of silicone oil transferred to said surface through contact with a silicone oil coating present upon the exposed surface of a lower heat sealable surface layer (c);

(b) a core layer derived from an isotactic polypropylene; and, (c) a lower heat sealable layer coextensively adherent to the lower surface of core layer (b), said lower layer (c) being formed from a polymer selected from the group consisting of ethylene-propylene-butene-1 terpolymer, ethylene-propylene random copolymer and blends thereof, said polymer being compounded with an anti-blocking effective amount of anti-blocking agent and a quantity of silicone oil such that a coefficient of friction-reducing amount thereof will be present on the exposed surface of layer (c) as well as the exposed surface of layer (a) following mutual contact of said surfaces.

The term "water-based coating" is to be understood in its broadest sense and includes water-based inks and water-based adhesives.

Unlike the prior art composite films which may contain a fatty acid amide such as erucamide, stearamide, behenamide, oleamide, etc., to impart lubricity or slip to the films, e.g., the multilayer films described in U.S. Pat. Nos. 4,343,852 and 4,419,411, supra, the film of this invention does not contain such an ingredient since it usually interferes with the receptivity of the film surface for, and the adhesion of, water-based inks and water-based adhesives. Moreover, when concentrated at the film surface, a fatty acid amide can appreciably reduce the optical clarity of the film.

A heat sealable film possessing both good lubricity and both good receptivity for water-based surface coating materials and optical clarity such as the film of the present invention is highly advantageous since it permits the convertor/end user to utilize inks and/or adhesives which do not incorporate organic solvents. Organic solvents generally present health, explosion and fire hazards and resort must be had to expensive ventilation and safely equipment to provide an acceptable working environment where they are used. Even with the use of such equipment, in some jurisdictions, the atmospheric emission of organic solvents is prohibited and expensive solvent recovery systems are required to comply with legal limitations. The films herein avoid organic solvent-containing coating materials thereby eliminating the health, safety and environmental problems attendant their use as well as the cost of the equipment required to deal with the hazards which they pose.

DESCRIPTION OF THE PREFERRED EMBODIMENTS

Upper surface layer (a) is derived from an ethylene-propylene-butene-1 (EPB) terpolymer, an ethylene-propylene (EP) random copolymer or a blend thereof. Suitable EPB terpolymers are those obtained from the random interpolymerization of from about 1 to about 8 weight percent ethylene, preferably from about 3 to about 6 weight percent ethylene with from about 65 to about 95 weight percent propylene, preferably from about 86 to about 93 weight percent propylene, butene-1 representing the balance. The foregoing EPB terpolymers are for the most part characterized by a melt index at 230° C. of from about 2 to about 16 and advantageously from about 3 to about 7, a crystalline melting point of from about 100° C. to about 120° C., an average molecular weight of from about 25,000 to about 100,000 and a density within the range of from about 0.89 to about 0.92 gm/cm$^3$.

The EP random copolymers generally contain from about 2 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$.

In general, where blends of EPB terpolymer and EP random copolymer are used, said blends will contain from about 10 to about 90 weight percent EPB terpolymer and preferably from about 40 to about 60 weight percent EPB terpolymer, the balance being made up of EP random copolymer.

Prior to extrusion, layer (a) is compounded with an anti-blocking effective amount of an anti-blocking agent, e.g., silica, clays, talc, glass, and the like, which are preferably provided in the form of approximately spheroidal particles. The major proportion of these particles, for example, anywhere from more than half to as high as 90 weight percent or more, will be of such a size that a significant portion of their surface area, for example, from about 10 to about 70 percent thereof, will extend beyond the exposed surface of layer (a). Although the polymer from which layer (a) is formed is not compounded with a silicone oil, this layer will ultimately acquire a coefficient of friction-reducing amount of silicone oil. Thus, when the finished film laminate containing silicone oil on the exposed surface of layer (c) is taken up on a winding coil, some of the silicone oil will be transferred from this surface to the exposed surface of layer (a), primarily to the exposed surfaces of the anti-blocking agent particles which protrude from layer (a). However, since the interior of layer (a) contains no amount of silicone oil which could interfere with the heat sealing properties of this layer (and ordinarily contains no silicone oil at all), the presence thereon of the transferred silicone oil serves to reduce the coefficient of friction of the layer without significantly impairing its heat sealability.

Optionally, layers (a) and/or (c) can contain a minor amount of a wax, e.g., a microcrystalline wax for added lubricity. Amounts of wax of from about 2 to about 15 weight percent of either or both layers (a) and (c) can be used if desired. Either or both of these layers can also contain pigments, fillers, stabilizers, light protective agents or other suitable modifying ingredients if desired.

In order to enhance its receptivity for water-based coatings, layer (a) can be treated by such known and conventional techniques as corona discharge and flame treating.

Core layer (b) is derived from a polypropylene of high stereoregularity and in general will be chosen from among the highly isotactic polypropylenes. The preferred polypropylenes are well known in the art and are formed by polymerizing polypropylene in the presence of stereospecific catalyst systems. The polypropylenes can have a melt index at 230° C. ranging from about 1.0 to about 25.0. The crystalline melting point is about 160° C. The number average molecular weight ranges from about 25,000–100,000 and density ranges from about 0.90 to 0.91.

Lower layer (c) of the film laminate can be of substantially the same composition as that of upper surface layer (a) except that the polymer constituting layer (c) is compounded with a silicone oil. The silicone oil advantageously possesses a viscosity of from about 350 to about 100,000 centistokes with 10,000 to about 30,000 centistokes being especially preferred. Examples of suitable silicone oils are polydialkylsiloxanes, polyalkylphenylsiloxanes, olefin-modified siloxane oils, polyether-modified silicone oils, olefin/-polyether-modified silicone oils, epoxy-modified silicone oils and alcoholmodified silicone oils, polydialkylsiloxanes which preferably have from about 1 to about 4 carbon atoms in the alkyl group, in particular polydimethyl-siloxanes. Of the foregoing, the polydialkylsiloxanes, in particular, a polydimethylsiloxane, are preferred for use herein.

The silicone oil is added to layer (c) generally in the form of a dispersion or emulsion, the silicone being present within, as well as on the exposed surface of, this layer as discrete microglobules, frequently of an average size of from about 1 to about 2 microns. The silicone oil, which is generally substantially uniformly distributed on the exposed surface of layer (c), is responsible for imparting a reduced coefficient of friction to this surface as well as to the exposed surface of layer (a) when some of the oil is transferred thereto after these surfaces have been placed in mutual contact, e.g., as will occur when the laminate film has been wound on a winding coil.

Polydimethylsiloxane or other silicone oil can be present at from about 0.15 to about 1.5 weight percent of lower layer (c). Some of this silicone oil will, of course, be present on the exposed surface of layer (c). The amount selected should in any event be sufficient to provide a coefficient of friction of layers (a) and (c) (following transfer of silicone oil microglobules to the latter) of about 0.4 or less, preferably between about 0.25 to about 0.3 up to at least about 60° C. Because of the unique manner in which the silicone oil is applied to just the exposed surface of upper layer (a), such layer exhibits an improved coefficient of friction but not at the expense of its receptivity to water-based coatings, its heat sealability or its optical clarity.

The silicone oil should be incorporated as homogeneously as possible in the polymer constituting layer (c). This can be achieved by either incorporating the silicone oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170° to about 270° C.

Core layer (b) will usually represent from about 70 to about 90 percent of the thickness of the overall film laminate or an even higher percentage thereof. Upper surface layer (a) and lower surface layer (c) are coextensively applied to each major surface of core layer (b), usually by being coextruded directly thereon. For example, the individual polymer streams constituting the material of layers (a), (b) and (c) can be coextruded from a conventional extruder through a flat sheet die, the melt streams being combined in an adapter prior to being extruded from the die. Each of surface layers (a) and (c) can comprise, for example, approximately 6.0% of the total thickness of the laminate. After leaving the die orifice, the laminate structure is chilled and the quenched sheet then heated and stretched, e.g., five times in the machine direction (MD) and then subsequently, for example, eight times in the transverse direction (TD). The edges of the film can be trimmed. The film laminate is then wound on a reel in order to effect transfer of silicone oil from the exposed surface of layer (c) to the exposed surface of layer (a) as previously explained.

The overall thickness of the laminate is not critical and advantageously can range from about 0.35 to about 2.0 mils.

In the following examples, Example 1 illustrates a film laminate containing erucamide, a fatty acid amide slip agent, and as such, is representative of a known type of composite film. Example 2 demonstrates the heat sealability-impairing effect of a laminate in which silicone oil has been compounded in the polymers constituting both layers (a) and (c). Example 3 is illustrative of a laminate film and film forming method in accordance with this invention. The properties of the three laminates of these examples are set forth in the accompanying table for purposes of comparison.

EXAMPLE 1

Comparative Example

A core layer (b) of about 20 microns thickness derived from a propylene homopolymer of high stereoregularity (Cosden 86700) containing 750 ppm erucamide is melted and coextruded with an upper surface layer (a) of about 0.61 microns thickness derived from a 50:40 weight percent blend of an ethylene-propylene-butene-1 terpolymer (CHISSO XF7700) and an ethylene-propylene random copolymer (Cosden W756) containing 10 weight percent of microcrystalline wax antiblock agent, and a lower surface layer (c) of about 1.2 microns thickness of the aforesaid ethylene-propylene-butene-1 terpolymer containing 10 weight percent of the wax. The EPB terpolymer components of layers (a) and (c) each contains about 0.2 weight percent of synthetic amorphous silica in the form of approximately spherical particles averaging 3 microns diameter. The extrudate is then cooled, reheated and stretched biaxially 4–6 times in the machine direction and 8–10 times in the transverse direction. Subsequently, upper surface layer (a) is corona treated in a conventional manner and wound in a mill roll form. After 1–3 days of hot room aging at 100°–125° F., the coefficient of friction of layers (a) and (c) is 0.26 and 0.29 respectively. However, as shown in the table below, layer (a) was not receptive to a water-based polyvinylidene chloride adhesive (Morton 2015).

EXAMPLE 2

Comparative Example

Example 1 was substantially repeated but using Shell DX 5097 isotactic polypropylene as the resin constituting core layer (b). Erucamide was not present. Polydimethylsiloxane at 0.6 weight percent was compounded in layers (a) and (c). As shown from the data in the accompanying table, coefficient of friction behavior was good and water-based ink (Aqualam P-White) and water-based adhesive (Morton 2015) wet-out/adhesion were acceptable. However, the heat sealability capability of layer (a) was essentially destroyed due to the presence of the silicone oil in layer (a) as well as in layer (c).

EXAMPLE 3

Example 2 was substantially repeated but with 0.6 weight percent of polydimethylsiloxane compounded in layer (c) only. Layer (a) contained no silicone oil. The improvement of coefficient of friction equilibrium, good converting characteristics of Morton 2015 PVDC and retention of heat sealability are noted from the data in the accompanying table. The film possesses good optical clarity characteristics.

TABLE

| Example | Treated Side | Slip | COF Treated | COF Untreated | Crimp Seal Strength 240° F. ¾ Sec. Treated/Treated | Aqualam-P Wet-Out | White Adhesion | Morton 2015 Wet-Out | PVDC Adhesion | Bond Strength (GM/IN) |
|---|---|---|---|---|---|---|---|---|---|---|
| 1 | Layer (a) | 750 ppm Erucamide | .26 | .22 | 425 gm/in | OK | OK | Very Poor | Very Poor | Very Poor |
| 2 | Layer (a) | Silicone oil in Layers (a) and (c) | .30 | .30 | 0 | Good | Good | Good | Good | 714 |
| 3 | Layer (a) | Silicone oil in Layer (c) only | .30 | .30 | 475 gm/in | Good | Good | Good | Good | 590 |

What is claimed is:

1. An oriented, heat sealable polymer film laminate possessing a low coefficient of friction, good receptivity for water-based coatings and good optical clarity which comprises:
   (a) an upper heat sealable, water-based coating-receiving layer coextensively adherent to the upper surface of a core layer (b), said upper layer (a) being formed from a polymer selected from the group consisting of ethylene-propylene-butene-1 terpolymer, ethylene-propylene random copolymer and blends thereof, said polymer being compounded with an anti-blocking effective amount of anti-blocking agent but being substantially devoid of silicone oil, the exposed surface of upper layer (a) being coated with a coefficient of friction-reducing amount of silicone oil transferred to said surface through contact with a silicone oil coating present upon the exposed surface of a lower heat sealable surface layer (c);
   (b) a core layer derived from an isotactic polypropylene; and,
   (c) a lower heat sealable layer coextensively adherent to the lower surface of core layer (b), said lower layer (c) being formed from a polymer selected from the group consisting of ethylene-propylene-butene-1 terpolymer, ethylene-propylene random copolymer and blends thereof, said polymer being compounded with an anti-blocking effective amount of anti-blocking agent and a quantity of silicone oil such that a coefficient of friction-reducing amount thereof will be present on the exposed surface of layer (c) as well as the exposed surface of layer (a) following mutual contact of said surfaces.

2. The laminate of claim 1 containing a wax in layer (a) and/or (c).

3. The laminate of claim 1 containing a microcrystalline wax in layer (a) and/or (c).

4. The laminate of claim 1 in which the exposed surface of layer (a) is subjected to corona discharge or flame treating.

5. The laminate of claim 1 in which the silicone oil is a polydialkylsiloxane.

6. The laminate of claim 1 in which the silicone oil is a polydimethylsiloxane.

7. The laminate of claim 1 in which a sufficient amount of silicone oil is incorporated in layer (c) as to confer upon the exposed surfaces of layers (a) and (c), following their mutual contact a coefficient of friction of less than about 0.4 up to at least about 60° C.

8. The laminate of claim 1 in which a sufficient amount of silicone oil is incorporated in layer (c) as to confer upon the exposed surfaces of layers (a) and (c), following their mutual contact a coefficient of friction of from about 0.25 to about 0.3 up to at least about 60° C.

9. The laminate of claim 1 in which at least a major proportion of the anti-blocking agent is in the form of particles of approximately spherical shape.

10. The laminate of claim 1 in which the anti-blocking agent is silica.

11. The laminate of claim 1 in which the anti-blocking agent is silica particles at least a major proportion of which are approximately spherical in shape.

12. The laminate of claim 1 in which from about 10 to about 70 percent of the total surface area of the anti-blocking agent extends beyond the exposed surface of layers (a) and (c).

13. The laminate of claim 1 in which the ethylene-propylene-butene-1 terpolymer component of the blend constituting layer (a) and/or (c) is from about 10 to about 90 weight percent thereof with ethylene-propylene random copolymer making up the balance of the blend.

14. The laminate of claim 1 in which the ethylene-propylene-butene-1 terpolymer component of the blend constituting layer (a) and/or (c) is from about 40 to about 60 weight percent thereof with ethylene-propylene random copolymer making up the balance of the blend.

15. The laminate of claim 1 in which the ethylene-propylene-butene-1 terpolymer is obtained from the random interpolymerization of from about 1 to about 8 weight percent ethylene with from about 65 to 95 propylene with butene-1 making up the balance of the terpolymer.

16. The laminate of claim 1 in which the ethylene-propylene-butene-1 terpolymer is obtained from the random interpolymerization of from about 3 to about 6 weight percent ethylene with from about 86 to about 93 weight percent propylene with butene-1 making up the balance of the terpolymer.

17. The laminate of claim 1 in which the ethylene-propylene random copolymer is obtained from the random co-polymerization of from about 2 to about 7 weight percent ethylene with propylene making up the balance of the copolymer.

18. The laminate of claim 1 in which layer (b) constitutes at least about 70 percent of the total thickness of the laminate with the balance of the thickness of the laminate being distributed among layers (a) and (c).

19. The laminate of claim 18 in which the total thickness of the laminate is from about 0.35 to about 2.0 mils.

20. The method of making a polymer laminate which comprises:

(1) providing the upper major surface of a core layer (b) derived from an isotactic polypropylene with a coextensive heat sealable, water-based coating-receiving layer (a) formed from a polymer selected from the group consisting of ethylene-propylene-butene-1 terpolymer, ethylene-propylene random copolymer and blends thereof, said polymer being compounded with an anti-blocking effective amount of anti-blocking agent but being substantially devoid of silicone oil;

(2) providing the lower major surface of core layer (b) with a coextensive heat sealable surface layer (c) formed from a polymer selected from the group consisting of ethylene-propylene-butene-1 terpolymer, ethylene-propylene random copolymer and blends thereof, said polymer being compounded with an anti-blocking effective amount of anti-blocking agent and a quantity of silicone oil such that a coefficient of friction-reducing amount thereof will be present on the exposed surface of layer (c) as well as the exposed surface of layer (a) following mutual contact of said surfaces; and (3) contacting the exposed surface of layer (c) with the exposed surface of layer (a) such that a coefficient of friction-reducing amount of silicone oil is transferred from the exposed surface of layer (c) to the exposed surface of layer (a).

21. The method of claim 20 wherein contacting step (3) is carried out by winding the film laminate on a reel.

22. The method of claim 20 wherein following step (2), the exposed surface of layer (a) is subjected to corona discharge or flame treatment.

* * * * *